: US 11,028,329 B1
(45) Date of Patent: Jun. 8, 2021

(54) PRODUCING C6-C8 AROMATICS FROM FCC HEAVY NAPHTHA

(71) Applicant: SAUDI ARABIAN OIL COMPANY, Dhahran (SA)

(72) Inventors: Yufeng He, Dhahran (SA); Abdullah Al Ghazal, Dhahran (SA); Qi Xu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/845,549

(22) Filed: Apr. 10, 2020

(51) Int. Cl.
*C10G 63/04* (2006.01)
*B01J 8/18* (2006.01)
(Continued)

(52) U.S. Cl.
CPC .......... *C10G 63/04* (2013.01); *B01J 8/1827* (2013.01); *B01J 8/24* (2013.01); *B01J 19/245* (2013.01); *C10G 61/02* (2013.01); *C10L 1/06* (2013.01); *B01J 2219/0004* (2013.01); *C10G 2300/1044* (2013.01); *C10G 2400/02* (2013.01); *C10G 2400/30* (2013.01); *C10L 2200/0423* (2013.01); *C10L 2270/023* (2013.01)

(58) Field of Classification Search
CPC ............ C10G 61/03; C10G 63/04; C10L 1/06
USPC ............................................ 208/70; 585/438
See application file for complete search history.

(56) References Cited

U.S. PATENT DOCUMENTS 3,714,033 A 1/1973 Somekh et al.
4,247,729 A * 1/1981 Takahashi et al. ....... C07C 4/12
(Continued)

FOREIGN PATENT DOCUMENTS

WO 2010061986 A1 6/2010

OTHER PUBLICATIONS

International Search Report issued in corresponding International Application No. PCT/US2020/031859, dated Nov. 25, 2020 (3 pages).
(Continued)

*Primary Examiner* — Nina Bhat
(74) *Attorney, Agent, or Firm* — Osha Bergman Watanabe & Burton LLP (57) ABSTRACT

A method of forming $C_6$-$C_8$ aromatics may include selectively dealkylating a Fluid Catalytic Cracking (FCC) heavy cut naphtha that has at least $C_{9+}$ aromatics to selectively crack $C_{2+}$ alkyl chains from the $C_{9+}$ aromatics, thereby forming the $C_6$-$C_8$ aromatics. The selectively de-alkylated heavy cut naphtha is then combined with a FCC middle cut naphtha, and aromatics including the $C_6$-$C_8$ aromatics are separated from the combined stream. A system for forming $C_6$-$C_8$ aromatics may include a fluid catalytic cracking unit for producing a FCC heavy cut naphtha comprising at least $C_{9+}$ aromatics; a de-alkylation reactor for selectively cracking $C_{2+}$ alkyl chains from the $C_{9+}$ aromatics, thereby forming the $C_6$-$C_8$ aromatics; and an aromatic extraction unit for extracting at least a portion of the $C_6$-$C_8$ aromatics.

19 Claims, 3 Drawing Sheets

(51) Int. Cl.
*C10G 61/02* (2006.01)
*C10L 1/06* (2006.01)
*B01J 8/24* (2006.01)
*B01J 19/24* (2006.01)

(56) References Cited

U.S. PATENT DOCUMENTS

| | | | |
|---|---|---|---|
| 4,320,242 A | 3/1982 | Onodera et al. | |
| 4,921,581 A | 5/1990 | Lee et al. | |
| 5,085,740 A | 2/1992 | Lee et al. | |
| 5,139,651 A | 8/1992 | Forte | |
| 5,310,477 A | 5/1994 | Lomas | |
| 5,310,480 A | 5/1994 | Vidueira | |
| 5,552,033 A | 9/1996 | Shih | |
| 5,685,972 A | 11/1997 | Timken et al. | |
| 5,792,338 A * | 8/1998 | Gosling et al. | C10G 35/38 |
| 6,096,938 A | 8/2000 | Ghosh | |
| 8,183,424 B2 * | 5/2012 | Levin | C07C 6/12 |
| 8,926,829 B2 | 1/2015 | Serban et al. | |
| 8,940,950 B2 * | 1/2015 | Ellrich | C10G 55/06 |
| | | | 585/319 |
| 9,000,247 B2 | 4/2015 | Abudawoud | |
| 9,109,169 B2 | 8/2015 | Al-Therwi et al. | |
| 9,434,894 B2 | 9/2016 | Mehlberg et al. | |
| 9,796,937 B2 | 10/2017 | Fanget et al. | |
| 10,173,950 B2 * | 1/2019 | Abudawoud et al. | C07C 4/18 |
| 10,252,958 B2 * | 4/2019 | Xu et al. | C07C 15/08 |
| 10,781,149 B2 * | 9/2020 | Molinier et al. | C07C 6/12 |
| 2011/0130603 A1 * | 6/2011 | Levin | C07C 5/22 |
| 2013/0033123 A1 * | 3/2013 | Lafyatis et al. | C07C 2/00 |
| 2013/0116489 A1 * | 5/2013 | Wu et al. | C07C 7/163 |
| 2015/0368571 A1 | 12/2015 | Mehlberg et al. | |
| 2017/0009158 A1 * | 1/2017 | Ward et al. | C10G 69/08 |
| 2018/0273859 A1 * | 9/2018 | Frey | C10G 47/16 |
| 2018/0327675 A1 | 11/2018 | Funk et al. | |
| 2018/0371337 A1 | 12/2018 | Dongara et al. | |
| 2019/0359541 A1 * | 11/2019 | Bafna | C10G 45/44 |

OTHER PUBLICATIONS

Written Opinion issued in corresponding International Application No. PCT/US2020/031859, dated Nov. 25, 2020 (7 pages).

* cited by examiner

PRODUCING C6-C8 AROMATICS FROM FCC HEAVY NAPHTHA

BACKGROUND

Figure 1:
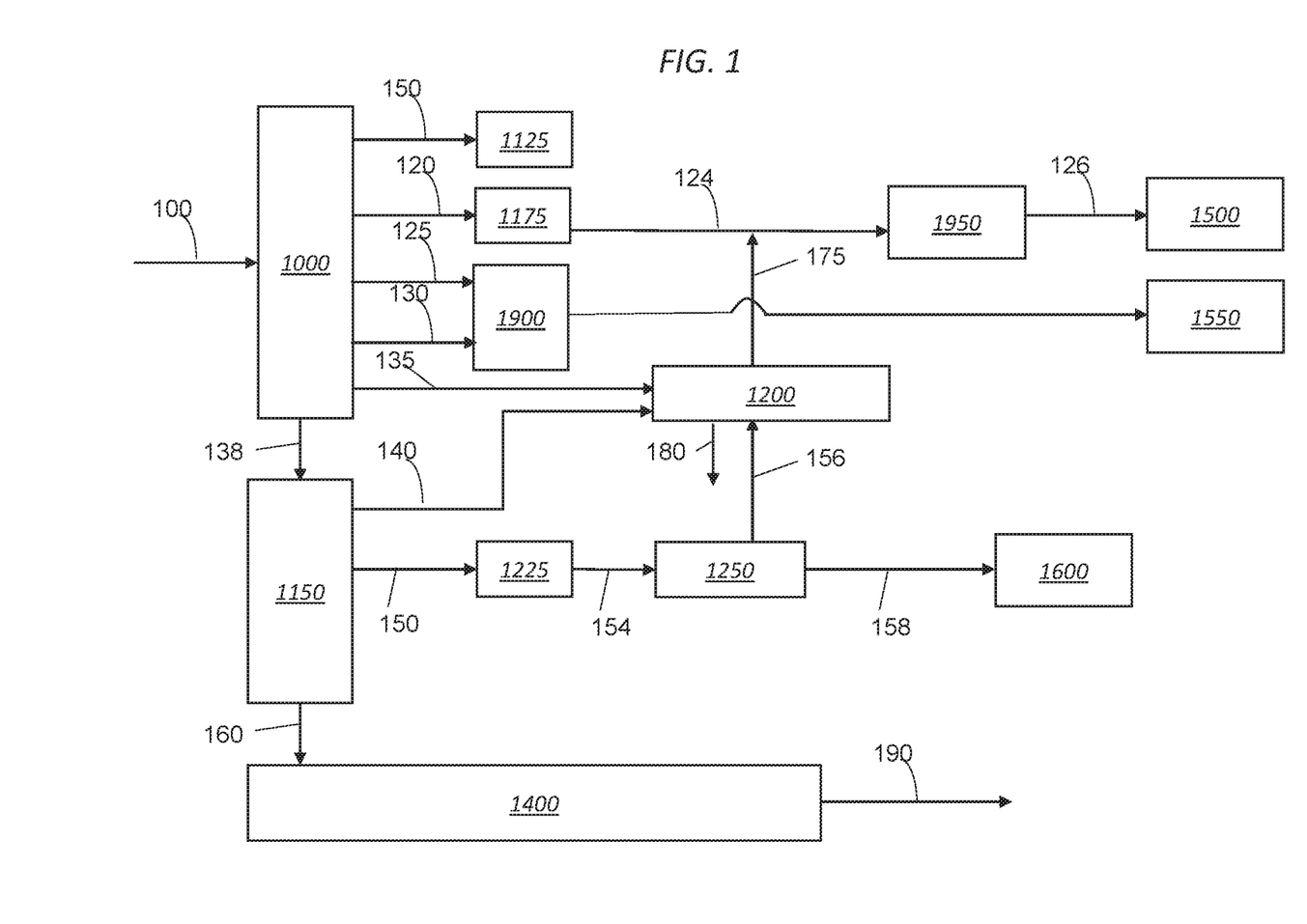
FIG. 1 depicts a schematic illustration of a refinery.

Crude oil is conventionally turned into gasoline and petrochemical products in refineries. Refineries use physical separation processes such as atmospheric distillation and vacuum distillation to separate crude oil based on boiling point. As shown in FIG. 1, crude oil 100 is introduced to distillation column 1000, such as an atmospheric distillation column. Distillation column 100 can be operated to separate acid gas 115, naphtha 120, kerosene/jet 125, light gas oil 130, heavy gas oil 135, and atmospheric distillate residue 138 that may be directed to vacuum distillation column 1150. Acid gas stream 115 may be distilled and directed to a gas treating unit 1125. Light fraction stream 120 may be directed to a naphtha hydrotreating unit 1175 to produce treated light fraction fluid stream 124. Treated light fraction fluid stream 124 is directed to catalytic reformer and/or isomerization unit 1950 to produce reformed product stream 126 that is then introduced to gasoline pool 1500. The jet/kerosene stream 125 and light gas oil stream 130 is directed to diesel hydrotreating unit 190 and into the diesel pool 1550.

Vacuum distillation column 1150 can be employed to separate different vacuum gas oils such as light vacuum gas oil 140, heavy vacuum gas oil 150, and vacuum residue stream 160 under vacuum conditions. Light vacuum gas oil 140 can be introduced to Fluid Catalytic Cracking (FCC) unit 1200. FCC unit 1200 may also receive heavy gas oil 135. The effluent may be fractionated by fractionator unit comprised in hydrocracking unit 1200 into light fraction 175 and gas oil 180. Light fraction 175 includes the naphtha range hydrocarbons and kerosene range hydrocarbons present in light vacuum gas oil 140. The light fraction 175 can be mixed with treated light fraction stream 124 and introduced to reforming/isomerization unit 1950 prior to being directed to gasoline pool 1500. In at least one embodiment, upgraded light fraction 175 can be introduced to gasoline 1500 without first mixing with treated light fraction stream 124.

Heavy vacuum gas oil 150 can be introduced to vacuum gas oil hydrotreater 1225 which may comprise a hydrotreating reactor and separator. Treated heavy vacuum gas oil stream 154 can be fed to catalytic cracking unit 1250, which may be, for example, a catalytic hydrocracking unit, a fluid catalytic cracking unit, etc. The effluent of catalytic cracker 1250 may be separated into hydrocracked gasoline stream 158 and light cracked distillate stream 156. Hydrocracked gasoline stream 158 can then be fed to hydrocracked gasoline pool 1600 and light cracked distillate stream 156 can be fed to hydrocracker 1200 with light vacuum gas oil stream 140. Vacuum residue stream 160 can be introduced to resid (residual) upgrading unit 1400. Resid upgrading unit 1400 can be any process unit capable of upgrading a heavy fraction stream. Resid upgrading unit 1400 can produce resid upgraded product.

In the past, refineries were often designed to optimize the production of gasoline. However, the more complex refineries have a greater secondary conversion capability so that they can produce different types of petroleum products. Fluid catalytic cracking (FCC) is one type of secondary unit operation. FCC is primarily used in producing additional gasoline and distillate fuels through a chemical process that uses a catalyst and heat to break apart large molecules into smaller ones that make up gasoline, distillate and other higher-value products like butane and propane. After that, the resulting effluent is processed in fractionators, which separate the effluents into several intermediate products, including light gas oil, gasoline and heavy gas oil, based on the different boiling points.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of forming $C_6$-$C_8$ aromatics including selectively dealkylating a Fluid Catalytic Cracking (FCC) heavy cut naphtha that has at least $C_{9+}$ aromatics to selectively crack $C_{2+}$ alkyl chains from the $C_{9+}$ aromatics, thereby forming the $C_6$-$C_8$ aromatics. The selectively de-alkylated heavy cut naphtha is then combined with a FCC middle cut naphtha, and aromatics including the $C_6$-$C_8$ aromatics are separated from the combined stream.

In another aspect, embodiments disclosed herein relate to a system for forming $C_6$-$C_8$ aromatics that includes a fluid catalytic cracking unit for producing a FCC heavy cut naphtha comprising at least $C_{9+}$ aromatics; a de-alkylation reactor for selectively cracking $C_{2+}$ alkyl chains from the $C_{9+}$ aromatics, thereby forming the $C_6$-$C_8$ aromatics; and an aromatic extraction unit for extracting at least a portion of the $C_6$-$C_8$ aromatics.

Other aspects and advantages of this disclosure will be apparent from the following description made with reference to the accompanying drawings and the appended claims.

DETAILED DESCRIPTION

One or more embodiments of the present disclosure relate to processes for the production of $C_6$-$C_8$ aromatics including BTEX (Benzene, Toluene, Ethylbenzene and mixed Xylenes), or more simply BTX components from a FCC heavy cut naphtha (HCN)($C_8$-$C_{11}$ materials). Conventionally, FCC naphtha is generally used in gasoline blending and is desulfurized and reformed before it can be blended into finished gasoline.

Gasoline refiners and blenders conventionally use $C_{6+}$ aromatics, which includes the $C_6$-$C_8$ BTX components to improve octane ratings and minimize knocking in petrol engines. However, environmental regulations are increasingly limiting the amount of aromatics ($C_{6+}$) content in gasoline fuel. Conventionally, BTX are obtained through catalytic reforming, which converts low-octane linear hydrocarbons into branched alkanes and cyclic naphthenes, called reformates, increasing the octane number significantly of the gasoline blending pool. Reformate is also the main source of BTX for the plastic industry. A major disadvantage of the reforming of naphtha is that the proportions of toluene and xylene produced do not match the demands. Many sites, therefore, incorporate a disproportionation plant, which converts toluene into xylene and benzene, which have higher demand.

As mentioned, BTX represents the building blocks for materials such as polystyrene, styrene-butadiene rubber, polyethylene terephthalate, polyester, etc., and the demand for these benzene derivatives grows each year. Each of the BTX products has alternative markets: benzene is used as precursor for many chemical and solvation processes. Toluene and ethylbenzene are also reactants and precursors in chemical and polymerization processes. Xylene ($C_8H_{10}$) has three isomers: para-xylene (p-xylene), meta-xylene (m-xylene) and ortho-xylene (o-xylene). They are all petrochemical feedstocks of value. P-xylene is a feed for polyester; O-xylene is the feed for phthalic anhydride manufacturing which feeds resin and urethane production. M-xylene makes isophthalic acid and plasticizers, but it has a lower commercial demand than the other two isomers. Thus, the present inventors have provided processes and systems that add flexibility in a modern refinery, allowing refineries to adapt the production of BTX to market demands and environmental regulation.

In particular, embodiments of the present disclosure are directed to obtaining $C_6$-$C_8$ aromatics including BTX from a FCC heavy cut naphtha. Fluid catalytic cracking (FCC) adjusts the carbon/hydrogen (C/H) ratio by rejecting excess carbon, whereas other refinery processes add hydrogen. In a large refinery oriented toward transportation fuels, the FCC unit can account for more than 40% of the total refinery output of gasoline and diesel. As shown in FIG. 1, feedstocks to fluid catalytic cracking unit can include heavier oils or residue such as gas oils from atmospheric distillation and gas oils from vacuum distillation, but also may include feeds from coking and deasphalting processes. These feedstocks typically have a boiling range of 340 to 540° C. (650 to 1000° F.). While FIG. 1 illustrates a conventional refinery, the feedstocks to fluid catalytic cracking in accordance with the present disclosure may include any conventional feedstock, including but not limited to those shown in FIG. 1.

In or more embodiments, in a FCC process, heavy-fraction oil is continuously brought into contact with a catalyst that is kept in a fluidized state in order to crack the heavy-fraction oil, thereby producing light-fraction hydrocarbons, comprising mainly gasoline and light-fraction olefins. Thus, FCC uses a catalyst in the form of very fine particles that acts as a fluid when aerated with a vapor. Fresh feed is preheated in a process heater and introduced into the bottom of a vertical transfer line or riser with hot regenerated catalyst. The hot catalyst vaporizes the feed, bringing both to the desired reaction temperature of 470 to 575° C. (880 to 980° F.). The reaction products of the FCC are typically sent to a fractionator for separation into light gases, petrochemical feedstocks, gasoline blend stock (FCC naphtha), and diesel fuel blend stock (light cycle oil).

Figure 2:
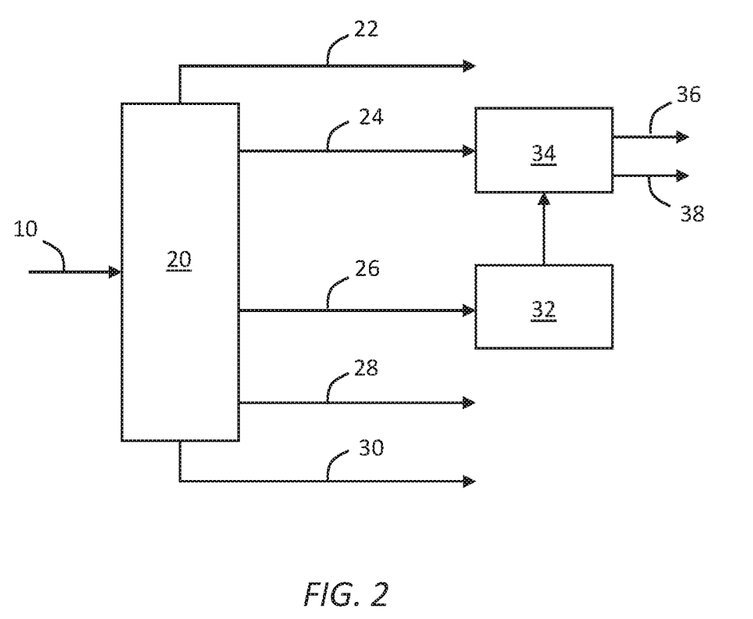
FIG. 2 shows a schematic illustration depicting the process to optimize production of $C_6$-$C_8$ aromatics including BTX from the FCC Heavy Cut Naphtha (HCN)($C_8$-$C_{11}$ materials).

As mentioned above, embodiments in accordance with the present disclosure generally relate to a new process to produce $C_6$-$C_8$ aromatics including BTX from the FCC Heavy Cut Naphtha (HCN)($C_8$-$C_{11}$ materials). FIG. 2 illustrates an embodiment of the process and system of the present disclosure. As shown, a feed 10, which may include, but is not limited to, heavy oil is fed to a FCC unit 20. The heavy-fraction oil may have a boiling point, at atmospheric pressure, in the range of 250° C. or higher. The heavy-fraction oil used herein may include straight-run gas oil, vacuum gas oil, atmospheric residue, coker gas oil, or petroleum oils obtained by hydrofining or hydrotreated said residues and gas oils. These aforementioned petroleum oils may be used singly or as a mixture thereof, with a minor portion of light fraction oil.

In certain embodiments, the FCC unit 20 includes a regeneration zone that can include a regenerator, a down flow-type reaction zone that includes a downer reactor or "downer", a separation zone that includes a separator, and a stripping zone that includes a stripper. The FCC unit can also be equipped with multiple sensors operable to monitor the composition of the feed and product lines, and which can be integrated with a control system. The control system can include means to control catalyst loading rates and catalyst discharge rates in real-time, wherein the loading and discharge rates of catalyst are based on reactor performance.

In general, the operating conditions for the reactor of a FCC unit 20 include: a reaction temperature (° C.) having a lower limit of any of 400, 450 or 500 and an upper limit of any of 600, 620, or 650; a reaction pressure (barg) ranging from 1 to an upper limit to any of 3, 10, or 20; a contact time (in the reactor, seconds) having a lower limit of any of 0.5 or 1.0 to an upper limit of any of 2, 5, or 10; and a catalyst-to-feed ratio having a lower limit of any of 1:1, 4:1, or 8:1 and an upper limit of any of 10:1, 15:1, 20:1, or 25:1.

The catalyst used in the process described herein can be conventionally known or future developed catalysts used in fluid catalytic cracking processes, such as zeolites, silica-alumina, carbon monoxide burning promoter additives, bottoms cracking additives, light olefin-producing additives and any other catalyst additives routinely used in the fluid catalytic cracking process.

Products from the FCC unit 20 may include liquefied petroleum gas (LPG) 22, middle cut naphtha (MCN) 24, heavy cut naphtha (HCN) 26, light cycle oil 28, and a slurry oil 30. Moreover, it is also envisioned that a single naphtha effluent exits the FCC unit 20, which is subsequently sent to a catalytic naphtha splitter to separate the naphtha into at least two streams. LPG generally is a mixture of C3-C4 hydrocarbons and can also be referred to as "light ends." Middle cut naphtha has range of about 71° C. to about 145° C., and may comprise substantial majority of the C7 and C8 compounds. Heavy cut naphtha has a distillation cut in the range of about 145-214° C. and may comprise a substantial majority of the C9 and C10 compounds, with some quantities of C7, C8, C11, and C12 compounds. Light cycle oil has a distillation cut in the range of about 215-360° C. (or 215-330° C. in more particular embodiments) and may comprise a substantial majority of the C11-C13 compounds. The bottom product oil from the main fractionator contains residual catalyst particles which were not completely removed by cyclones in the top of the reactor. For that reason, the bottom product oil is often referred to as a slurry oil, which may contain heavier oils having a cut point above the light cycle oil.

Specifically, Table 1 below shows an exemplary boiling point distribution of an HCN:

TABLE 1

| D86 | ° C. |
|---|---|
| 1% | 145 |
| 5% | 164 |
| 10% | 167 |
| 30% | 173 |

TABLE 1-continued

| D86 | ° C. |
|---|---|
| 50% | 178 |
| 70% | 183 |
| 90% | 194 |
| 95% | 202 |
| 99% | 214 |

As mentioned above and apparent from the ranges below, the FCC HCN includes a majority of the $C_{9+}$ compounds. In one or more embodiments, at least 90 vol % (or at least 92, 94, or 96 vol % in more particular embodiments) of the FCC HCN is $C_{9+}$, which includes $C_{9+}$ olefins, $C_{9+}$ paraffins, $C_{9+}$ naphthenes, and $C_{9+}$ aromatics. The breakdown of components of the FCC HCN by type may include, for example, 0-10 vol. % paraffin, 0-10 vol. % naphthenes, 0-30 vol. % olefins, and 50-90 vol. % aromatics. For the $C_{9+}$ aromatics, the FCC HCN may include, for example, 20-75 wt % $C_9$ aromatics, 20-75 wt % $C_{10}$ aromatics, and 5-20 wt % $C_{11+}$ aromatics.

The FCC light cut oil may include, for example, 0-10 vol. % paraffin, 0-10 vol. % naphthenes, 0-20 vol. % olefins, and 60-95 vol. % aromatics. For the $C_{9+}$ aromatics, the FCC light cut oil may include, for example, 0-5 wt % $C_9$ aromatics, 0-10 wt % $C_{10}$ aromatics, 0-10 wt % $C_{11}$ aromatics, 0-30 wt % $C_{12}$ aromatics, 0-30 wt % $C_{13}$ aromatics, and 0-20 wt % $C_{14+}$ aromatics.

As shown, in accordance with one or more embodiments, the HCN 26 from the FCC unit 20 is routed to a dedicated selective de-alkylation unit 32 to convert the heavy one-ring aromatics into lighter ones by catalytically cracking $C_{2+}$ alkyl chains from the aromatic base. Thus, the de-alkylation is selective in that it selectively crack $C_{2+}$ alkyl groups. Optionally, prior to the selective dealkylation, the HCN 26 is hydro-treated to remove sulfur, nitrogen and any other contaminants.

In one or more embodiments, the feed (including HCNs) being selectively dealkylated may have an initial cut having a lower limit of any of 100, 120, or 140° C. and an end cut of any of upper limit of any of 180, 200, 214, 220, 240, 280, 300, 330, 340, or 360° C. Further, one of ordinary skill in the art would appreciate that the cut points may be selected based on the make-up of the distillation cuts including desired aromatics for selective dealkylation, catalyst being used, desired $C_6$-$C_8$ aromatics to produce, etc.

In one or more embodiments, the selective de-alkylation reactor 32 allows the refinery to produce more $C_6$-$C_8$ aromatics from the FCC HCN 26. The conditions employed in the dealkylation reaction may generally include a temperature ranging from 200-540° C. (more particularly 300-450° C.), a pressure ranging from 10-50 bar (more particularly, 10-20 bar), a liquid hourly space velocity ranging from 1-20 h$^{-1}$ (more particularly, 1-10 h$^{-1}$), and a hydrogen to feed ratio ranging from 0-20 (more particularly, 0-10). Examples of selective de-alkylation reactors include those described in U.S. Pat. Nos. 6,096,938 and 9,000,247. De-alkylation may use an acid catalyst, such as an aluminosilicate, an aluminophosphate, a silicoaluminophosphate, amorphous silica-alumina, an acidic clay, a zeolite such as mordenite or ZSM-5, a mixed metal oxide, such as WO/ZrO, phosphoric acid, sulfated zirconia, and mixtures thereof.

Selective de-alkylation reactions remove attached $C_{2+}$ alkyl substituents from an aromatic base under the presence of hydrogen, while minimizing demethylation. Therefore, the main product components from the dealkylation include benzene, toluene, xylenes, trimethyl-benzene, tetramethyl-benzene, etc., as shown below in Table 2, which reflects example aromatics that may be present in the HCN, and the corresponding aromatic formed following selective dealkylation:

TABLE 2

| FCC HCN Component | Respective component after Dealkylation Reactor |
|---|---|
| 123-M-Benzene | 123-M-Benzene |
| 124-M-Benzene | 124-M-Benzene |
| 135-M-Benzene | 135-M-Benzene |
| 1M, 2Ethyl-Benzene | Toluene |
| 1M, 3Ethyl-Benzene | Toluene |
| 1M, 4Ethyl-Benzene | Toluene |
| Cumene | Benzene |
| Indene | Xylene |
| n-Propyl-Benzene | Benzene |
| 12-Ethyl-Benzene | Benzene |
| 1234-M-Benzene | 1234-M-Benzene |
| 1235-M-Benzene | 1235-M-Benzene |
| 1245-M-Benzene | 1245-M-Benzene |
| 13-Ethyl-Benzene | Benzene |
| 14-Ethyl-Benzene | Benzene |
| 1M, 2n-Propyl-Benzene | Toluene |
| 1M, 3n-Propyl-Benzene | Toluene |
| 1M, 4n-Propyl-Benzene | Toluene |
| Mixed Ethyl-xylene | xylene |
| i-Butyl-Benzene | Benzene |
| m-Cymene | Toluene |
| n-Butyl-Benzene | Benzene |
| naphthalene | Naphthalene |
| o-Cymene | Toluene |
| p-Cymene | Toluene |
| Sec-Butyl-Benzene | Benzene |
| Tert-Butyl-Benzene | Benzene |

In one or more embodiments, the selective catalysts used may be able to treat aromatics with up to 12, 13, or 14 carbons. Thus, in one or more embodiments, at least a portion of the compounds that are conventionally defined as being light cycle oil 28 may be taken with the HCN 26 for selective dealkylation. Such embodiments may add flexibility for the refinery to be able to produce more aromatics at the expense of light cycle oil (LCO, known to contain many aromatic compounds with small side chains), by increasing the end cut point of HCN to produce more aromatics. For example, in such embodiments, the end cut point may be increased to 214-240° C.; however, it is also envisioned that that depending on the desired LCO to be selectively dealkylated, the end cut point may be even higher, such as at the upper end of the range of the LCO distillation cut (described above as being as high as 330° C. or 360° C.). For the de-alkylation of a 12 carbon aromatic compound, a mono-cyclohexyl-benzene for instance, cyclohexane and benzene will be formed.

The liquid effluent 34 from the selective dealkylation unit 32 is then combined with the MCN 24, which are together routed to an aromatics extraction unit 34. The aromatics extraction unit 34 removes aromatics 36 as an extract stream from the remaining paraffins and olefins which form raffinate stream 38. Raffinate stream 38 primarily contains paraffins and olefins, such as greater than about 80%, greater than about 90%, or greater than about 95% paraffins and olefins. Aromatics stream 36 primarily contains aromatics, such as greater than 80%, greater than about 90%, or greater than about 95% aromatics.

Figure 3A:
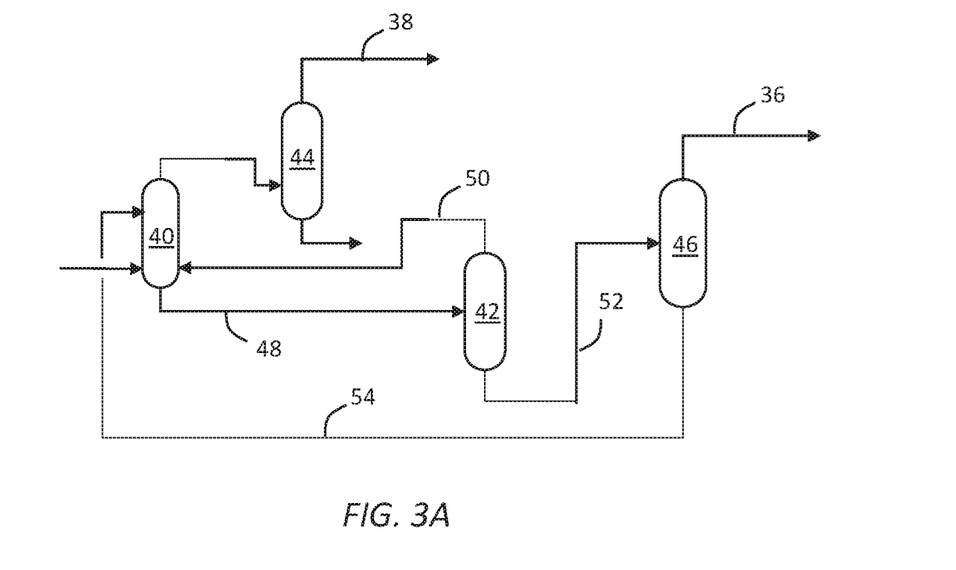
FIG. 3A shows a schematic illustration depicting the liquid-liquid extraction (LLE) system for aromatics extraction.
Figure 3B:
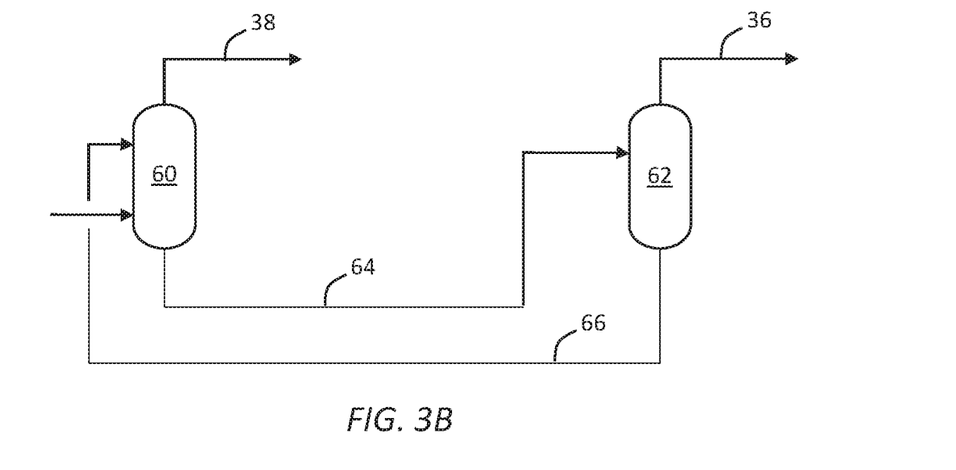
FIG. 3B shows a schematic illustration depicting the extractive distillation (ED) system for aromatics extraction.

Generally, it is difficult to separate aromatics by distillation due to components with similar chemical characteristics and boiling points. Specifically, there are too many non-aromatics in the BTX boiling range ($C_6$-$C_8$) for distillation to be a reliable separation method. In one or more embodiments, the aromatics extraction unit may include liquid-liquid extraction (LLE), as shown in FIG. 3A, or extractive distillation (ED), as shown in FIG. 3B. In both systems, an extraction solvent is used for aromatics extraction and is recirculated internally. The solvent containing extracted aromatics is called rich solvent; the recirculated solvent after separation from aromatics is called lean solvent. Only a very small amount of solvent is lost slowly over time (solvent degradation) through the carryover of the raffinate and extract.

As shown in FIG. 3A, liquid-liquid extraction (LLE) includes four major columns: extractor 40, stripper 42, water wash column 44, and recovery column 46. When the extractor 40 is filled with liquid, the solvent dissolves (extracts) the aromatics moving downward, while the undissolved non-aromatics move upward. The liquid moves based on the density difference between the two liquid phases, with the extraction efficiency purely based on the "solubility difference" of aromatics and non-aromatics compounds in the extraction solvent. Aromatics have relatively higher solubility than non-aromatics (paraffins and olefins/naphthenes) in the solvent, which provides the fundamental extraction theory for LLE. However, the hydrocarbons with lower carbon numbers ($C_5$-$C_6$) also have relatively higher solubility than the hydrocarbons with higher carbon numbers ($C_8$-$C_9$), causing significant amounts of light non-aromatics to be dissolved and moved along with solvent to the bottom of the extractor 40. The extractor bottoms 48 are sent to the stripper 42, where the light hydrocarbons (including the light non-aromatics) 50 are stripped out and sent back to the extractor 40 to reject additional light non-aromatics. By doing so, the bottom of the stripper 42 can have the minimum amount of non-aromatics to achieve the required aromatics purity. The rich solvent 52 from the bottom of the stripper 42 is sent to the recovery column 46, where the aromatics are stripped out as extract product or aromatics stream 36, and the lean solvent 54 is recirculated to the extractor 40. Due to the high solvent carryover with non-aromatics from the top of the extractor 40, the water wash column 46 is used to wash and recover the solvent before the raffinate stream 38 is collected. The solvent used in LLE may be selected to be stable, nontoxic and simple to separate from aromatics in the recovery column. Additionally, the solvent may provide a decent solubility difference between aromatics and non-aromatics for LLE to work efficiently. For example, glycol, with its boiling point of 280 to 330° C. and density of 1.1 to 1.2 g/cm³, is a good example of solvent used in LLE.

As shown in FIG. 3B, extractive distillation (ED) includes two major columns: an extractive distillation column 60 and solvent recovery column 62. As opposed to solubility difference being the fundamental theory for LLE, the ED separation is based on the "relative volatility" of non-aromatics over aromatics created by a solvent environment. The higher relative volatility allows non-aromatics to be separated from aromatics more easily. The relative volatility can be boosted by the increase of the solvent-to-feed ratio, but with the cost of increased energy consumption and larger equipment. The solvent environment alters the boiling points for different compounds under the influence of the extraction solvent, which is also what happens in the extractive distillation column (EDC) 60. In the solvent environment of an EDC 60, the non-aromatics, which are relatively lighter (lower boiling point), will be distilled in the overhead of the EDC 60 as the raffinate stream 38. Meanwhile, the aromatics that are relatively heavier (higher boiling point) go to the bottom of the EDC 60 with the solvent and exit as a rich solvent 64. The rich solvent 64 from the EDC 60 bottom is then sent to the Solvent Recovery Column (SRC) 62, where the aromatics are stripped out as extract product or aromatics stream 36, and the lean solvent 66 is recirculated back to the EDC 60. When the boiling point difference between non-aromatics and aromatics is not enough or overlaps, then the boiling range in the feed needs to be reduced (e.g., BTX extraction reduced to BT extraction, or BT extraction reduced to B extraction); otherwise, the aromatics extract product may be contaminated by the non-aromatics and not have desired purity. As a result, different solvents in the ED system have different flexibility for the boiling range of the feed and, therefore, have limits on the extracted aromatics product. In particular, many refinery streams comprise "BTX" streams composed of close boiling mixtures of aliphatic hydrocarbons (such as isomers of heptane and octane). For instance, U.S. Pat. Nos. 3,714,033; 4,921,581 and 5,139,651 disclose the use of polyalkylene glycol solvents in this case. The use of sulfolane as a co-solvent in polyalkylene glycol solvent is described in U.S. Pat. No. 5,310,480. U.S. Pat. No. 5,085,740 discloses a ternary mixture composed of an N-alkyl-2-pyrollidone, a sulfolane compound, and a glycol.

Referring back to FIG. 2, the raffinate stream 38 may be either sent to a gasoline blending unit (not shown) or a reformer unit (not shown) to produce even more aromatics. The aromatics stream 36 (from either of the aromatic extraction units shown in FIG. 3A or 3B) is then sent to a downstream aromatics complex (not shown) to separate the aromatics from each other. The aromatics complex may include, for example, a benzene distillation column, a toluene distillation column, a heavy aromatic distillation column, a xylene distillation column, a para xylene separation unit, a xylene isomerization unit, a light distillation unit, and a trans-alkylation process unit. Moreover, it is also understood that the aromatics stream 36 may be combined with one or more other streams for separation of the aromatics.

In one or more embodiments, the aromatics stream 36 may be processed in a trans-alkylation unit (not shown) to further enhance desired aromatic production for instance. Trans-alkylation is a chemical reaction involving the transfer of an alkyl group from one organic compound to another. The reaction is used for the transfer of methyl and ethyl groups between benzene rings. Motivation for using trans-alkylation reactions is based on a difference in production and demand for benzene, toluene, and xylenes. Trans-alkylation can convert toluene, which is over-produced, into benzene and xylene, which are under-produced. Zeolites are often used as catalysts in trans-alkylation reactions. The catalyst used in the trans-alkylation reactor can be any selective TMBs trans-alkylation catalyst, such as the ones claimed in U.S. Pat. No. 5,866,741A. In one or more embodiments, the conditions in the trans-alkylation reactor may include a temperature ranging from 200-540° C. (in particular, 320-420° C.), a pressure ranging from 10-50 bar (in particular, 20-30 bar), a liquid hourly space velocity ranging from 1-20 $h^{-1}$ (in particular, 2-5 $h^{-1}$), and a hydrogen to feed ratio ranging from 0-20 (in particular, 2-8).

EXAMPLE

A PetroSIM simulation was carried out for a FCC process on a37 MBD hydrotreated VGO feed, which produced 4.5 MBD heavy cut naphtha. The HCN stream contains 7% paraffin, 21% olefin, 6% naphthene, and 65% aromatics (volumetric %). The HCN stream contains 23 wt % of C9 aromatics and 36 wt % of Aromatics, and the Table 3 below summarizes the molecular C9 and C10 aromatic components and its respective form after the selective dealkylation reactor.

TABLE 3

| FCC HCN Component | Wt % in FCC HCN | Respective component after Dealkylation Reactor |
|---|---|---|
| 123-M-Benzene | 0.0112 | 123-M-Benzene |
| 124-M-Benzene | 0.0751 | 124-M-Benzene |
| 135-M-Benzene | 0.0268 | 135-M-Benzene |
| 1M, 2Ethyl-Benzene | 0.0149 | Toluene |
| 1M, 3Ethyl-Benzene | 0.0367 | Toluene |
| 1M, 4Ethyl-Benzene | 0.0227 | Toluene |
| Cumene | 0.0018 | Benzene |
| Indene | 0.0370 | Xylene |
| n-Propyl-Benzene | 0.0042 | Benzene |
| 12-Ethyl-Benzene | 0.0038 | Benzene |
| 1234-M-Benzene | 0.0183 | 1234-M-Benzene |
| 1235-M-Benzene | 0.0526 | 1235-M-Benzene |
| 1245-M-Benzene | 0.0336 | 1245-M-Benzene |
| 13-Ethyl-Benzene | 0.0107 | Benzene |
| 14-Ethyl-Benzene | 0.0058 | Benzene |
| 1M, 2n-Propyl-Benzene | 0.0046 | Toluene |
| 1M, 3n-Propyl-Benzene | 0.0127 | Toluene |
| 1M, 4n-Propyl-Benzene | 0.0049 | Toluene |
| Mixed Ethyl-xylene | 0.1540 | xylene |
| i-Butyl-Benzene | 0.0010 | Benzene |
| m-Cymene | 0.0173 | Toluene |
| n-Butyl-Benzene | 0.0031 | Benzene |
| naphthalene | 0.0286 | Naphthalene |
| o-Cymene | 0.0039 | Toluene |
| p-Cymene | 0.0057 | Toluene |
| Sec-Butyl-Benzene | 0.0023 | Benzene |
| Tert-Butyl-Benzene | 0.0001 | Benzene |

Embodiments of the present disclosure may provide at least one of the following advantages. Aromatics in a heavy cut naphtha from fluid catalytic cracking may be selectively dealkylated to produce $C_6$-$C_8$ aromatics including BTX, which have been and still are in a rapid growth phase. Further, embodiments may also allow for processing of even heavier aromatics from a light cycle oil to further increase BTX production. Further, embodiments may also utilize trans-alkylation to enhance production of particularly desirable aromatics such as para-xylene.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of forming $C_6$-$C_8$ aromatics, comprising:
    selectively de-alkylating a Fluid Catalytic Cracking (FCC) heavy cut naphtha (HCN),
        wherein at least 90 vol % of the FCC HCN is $C_{9+}$,
        wherein the FCC HCN comprises at least $C_{9+}$ aromatics, to selectively crack $C_{2+}$ alkyl chains from the $C_{9+}$ aromatics, thereby forming the $C_6$-$C_8$ aromatics;
    combining the selectively de-alkylated heavy cut naphtha with a FCC middle cut naphtha (MCN); and
    separating aromatics including the $C_6$-$C_8$ aromatics from the combined stream.

2. The method of claim 1, further comprising:
    trans-alkylating separated aromatics.

3. The method according to claim 1, sending a raffinate remaining after separating the aromatics from the combined stream to a gasoline pool.

4. The method according to claim 1, wherein reforming a raffinate remaining after separating the aromatics from the combined stream.

5. The method according to claim 1, further comprising:
    combining a light portion of a FCC light cycle oil with the FCC heavy cut naphtha prior to the selective de-alkylation.

6. The method according to claim 5, wherein the FCC light cycle oil comprises $C_{10+}$ aromatics, $C_{10+}$ olefins, $C_{10+}$ paraffins, and $C_{10+}$ naphthenes.

7. The method of claim 1, wherein the FCC heavy cut naphtha comprises $C_{9+}$ olefins, $C_{9+}$ paraffins, $C_{9+}$ naphthenes, and $C_{9+}$ aromatics.

8. The method according to claim 1, wherein the FCC heavy cut naphtha has an initial cut above 100° C. and an end cut below 240° C.

9. The method according to claim 1, wherein the FCC heavy cut naphtha has an initial cut above 140° C. and an end cut below 180° C.

10. The method of claim 1, wherein the de-alkylation is performed at a temperature ranging from 200-540° C., a pressure ranging from 10-50 bar, a liquid hourly space velocity ranging from 1-20 h$^{-1}$, and a hydrogen to feed ratio ranging from 0-20.

11. A system for forming $C_6$-$C_8$ aromatics, comprising:
    a fluid catalytic cracking (FCC) unit for producing a FCC heavy cut naphtha (HCN) comprising at least $C_{9+}$ aromatics, wherein at least 90 vol % of the FCC HCN is $C_{9+}$;
    a de-alkylation reactor configured to receive the at least 90 vol % FCC HCN that is $C_{9+}$ for selectively cracking $C_{2+}$ alkyl chains from the $C_{9+}$ aromatics, thereby forming the $C_6$-$C_8$ aromatics; and
    an aromatic extraction unit configured to receive the $C_6$-$C_8$ aromatics for extracting at least a portion of the $C_6$-$C_8$ aromatics.

12. The system according to claim 11, further comprising a trans-alkylation unit for converting meta-xylene and ortho-xylene into para-xylene.

13. The system of claim 12, wherein the trans-alkylation unit receives aromatics from the aromatics extraction unit.

14. The system according to claim 11, wherein the aromatic extraction unit also receives an FCC middle cut naphtha feed from the fluid catalytic cracking unit.

15. The system according to claim 11, wherein the FCC heavy cut naphtha comprises 0-10 vol. % paraffin, 0-10 vol. % naphthenes, 0-30 vol. % olefins, and 50-90 vol. % aromatics.

16. The system according to claim 11, wherein the $C_{9+}$ aromatics in the FCC heavy cut naphtha comprises 20-75 wt % $C_9$ aromatics, 20-75 wt % $C_{10}$ aromatics and 5-20 wt % $C_{11}$ aromatics.

17. The system according to claim 11, wherein the selective de-alkylation reactor also receives an FCC light cut oil.

18. The system according to claim 11, wherein the FCC light cycle oil comprises 0-10 vol. % paraffin, 0-10 vol. % naphthenes, 0-20 vol. % olefins, and 60-95 vol. % aromatics.

19. The system according to claim 18, wherein the aromatics in the FCC light cycle oil comprise 0-5 wt % $C_9$ aromatics, 0-10 wt % $C_{10}$ aromatics, 0-30 wt % $C_{11}$ aromatics, 0-30 wt % $C_{12}$ aromatics, 0-30 wt % $C_{13}$ aromatics, and 0-20 wt % $C_{14+}$ aromatics.

\* \* \* \* \*